(12) United States Patent
Wang et al.

(10) Patent No.: US 8,422,506 B2
(45) Date of Patent: Apr. 16, 2013

(54) APPARATUSES, SYSTEMS, AND METHODS FOR LOAD BALANCING MANAGEMENT

(75) Inventors: Guotong Wang, Beijing (CN); Anthony Lee, San Diego, CA (US); Jian Gu, Beijing (CN); Shu Wang, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 324 days.

(21) Appl. No.: 12/785,610

(22) Filed: May 24, 2010

(65) Prior Publication Data

US 2010/0322070 A1 Dec. 23, 2010

Related U.S. Application Data

(60) Provisional application No. 61/218,418, filed on Jun. 19, 2009, provisional application No. 61/227,075, filed on Jul. 21, 2009.

(51) Int. Cl.
| | |
|---|---|
| H04L 12/28 | (2006.01) |
| H04L 12/56 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |

(52) U.S. Cl.
USPC .............. 370/395.21; 370/216; 370/331

(58) Field of Classification Search ............... None
See application file for complete search history.

(56) References Cited

U.S. PATENT DOCUMENTS

| | | | |
|---|---|---|---|
| 6,353,602 B1 * | 3/2002 | Cheng et al. .............. 370/332 |
| 7,242,941 B2 * | 7/2007 | Adatrao et al. ............ 455/442 |
| 7,496,367 B1 * | 2/2009 | Ozturk et al. ............. 455/453 |
| 7,979,078 B2 * | 7/2011 | Tiedemann et al. ....... 455/453 |
| 2006/0291426 A1 * | 12/2006 | Park et al. ................. 370/331 |
| 2007/0076662 A1 * | 4/2007 | Jain et al. .................. 370/331 |
| 2009/0046573 A1 * | 2/2009 | Damnjanovic ............ 370/216 |

* cited by examiner

*Primary Examiner* — Xavier Szewai Wong
(74) *Attorney, Agent, or Firm* — McClure, Qualey & Rodack, LLP (57) ABSTRACT

A mobile communication device for load balancing management is provided. In the mobile communication device, a wireless module receives data communication services via a first service node and receives a plurality of system information messages from the first service node and a plurality of second service nodes, wherein each of the system information messages has a forward-link quality threshold corresponding to a respective service node. Also, a controller determines a traffic type of the data communication services and a signal indicator of the first service node, and determines whether the signal indicator is less than the forward-link quality threshold corresponding to the first service node. In response to that the signal indicator is less than the forward-link quality threshold corresponding to the first service node, the controller switches the data communication services from the first service node to one of the second service nodes according to the traffic type.

18 Claims, 5 Drawing Sheets

APPARATUSES, SYSTEMS, AND METHODS FOR LOAD BALANCING MANAGEMENT

CROSS REFERENCE TO RELATED APPLICATIONS

This Application claims the benefit of U.S. Provisional Application No. 61/218,418, filed on Jun. 19, 2009, the entirety of which is incorporated by reference herein, and this Application also claims the benefit of U.S. Provisional Application No. 61/227,075, filed on Jul. 21, 2009, the entirety of which is incorporated by reference herein.

BACKGROUND OF THE INVENTION

1. Field of the Invention

The invention generally relates to load balancing in wireless communications, and more particularly, to load balancing management using traffic type, forward-link load level and/or reverse-link load level of the access network.

2. Description of the Related Art

Due to communication technology advancements in recent years, several mobile communication technologies, such as Wideband Code Division Multiple Access (W-CDMA) technology, 1× Code Division Multiple Access 2000 (1×CDMA 2000), 1× Evolution-Data Optimized (1×EVDO) system, and Long Term Evolution (LTE) technology, etc., have been developed to provide high communication rates. In a service network, an access network (AN) is equipped with an antenna, serving as a cell of the mobile communication system. An access terminal (AT) transceives radio signals from the AN, and thereby obtains data communication services. The AN may be connected to a mobile switching system which is further connected to a telephone/data network. The AN converts between RF signals and telephonic/data signals to allow communication between the AT and other communication terminals somewhere else in the telephone/data network. The coverage areas of multiple ANs may overlap in order to ensure that an AN is selected for providing communication services to the AT. Since there are concurrent services of multiple ANs, the mobile switching system must determine which AN will provide services to the AT. In a conventional mobile communication system, the choice of the AN is determined by comparing the signal strength of signals between the AT and each involved ANs. Generally, the AN with the strongest signal strength is assigned to provide communication services to the AT.

However, there may be situations where many ATs flock into the coverage of an AN or all ATs in the coverage of an AN request high bandwidth usage from the AN, which both cause a overload of the AN and result in rejected requests from any new ATs in the same area. Thus, in order to increase the serving capacity of a service network, it is preferred to have the loading of a service network evenly distributed among the ANs. Meanwhile, it is also desirable to serve all ATs in such a way that good performance can be achieved for the ATs and the service network.

BRIEF SUMMARY OF THE INVENTION

Accordingly, embodiments of the invention provide apparatuses, systems, and methods for load balancing. In one aspect of the invention, a mobile communication device for load balancing management is provided. The mobile communication device comprises a wireless module and a controller. The wireless module receives data communication services via a first service node and receives a plurality of system information messages from the first service node and a plurality of second service nodes, wherein each of the system information messages comprises a forward-link quality threshold corresponding to a respective service node. The controller determines a traffic type of the data communication services and a signal indicator of the first service node, and determines whether the signal indicator is less than the forward-link quality threshold corresponding to the first service node. In response to that the signal indicator is less than the forward-link quality threshold corresponding to the first service node, the controller further switches the data communication services from the first service node to one of the second service nodes according to the traffic type.

In another aspect of the invention, another mobile communication system for load balancing management is provided. The mobile communication system comprises a service network and a mobile communication device. The service network provides data communication services via a first carrier of a first service node and a plurality of second carriers of the first service node and at least one second service node, wherein each of the first service node and second service node broadcasts a system information message for its respective carrier, and each system information message comprises a forward-link load level corresponding to a respective carrier. The mobile communication device receives the data communication services via the first carrier, and receives the system information messages from the first carrier and the second carriers. Subsequently, the mobile communication device determines a plurality of signal indicators of the first carrier and the second carriers, and determines whether a random number is less than a predetermined threshold corresponding to the forward-link load level of the first carrier. In response to that the random number is less than the predetermined threshold corresponding to the forward-link load level of the first carrier, the mobile communication device further switches the data communication services from the first carrier to one of the second carriers according to the signal indicators and the forward-link load levels corresponding to the first carrier and the second carriers.

In another aspect of the invention, a load balancing management method for a mobile communication device connected to a service network via a first service node and a plurality of second service nodes is provided. The load balancing management method comprises receiving data communication services from the service network via the first service node, receiving a plurality of system information messages from the first service node and the second service nodes, wherein each of the system broadcast messages comprises a forward-link quality threshold corresponding to a respective service node. The load balancing management method further comprises determining a traffic type of the data communication services and a signal indicator of the first service node, determining whether the signal indicator is less than the forward-link quality threshold corresponding to the first service node, and switching the data communication services from the first service node to one of the second service nodes according to the traffic type in response to that the signal indicator is less than the forward-link quality threshold corresponding to the first service node.

Other aspects and features of the invention will become apparent to those with ordinary skill in the art upon review of the following descriptions of specific embodiments of the mobile communication devices, the mobile communication systems, and the load balancing methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
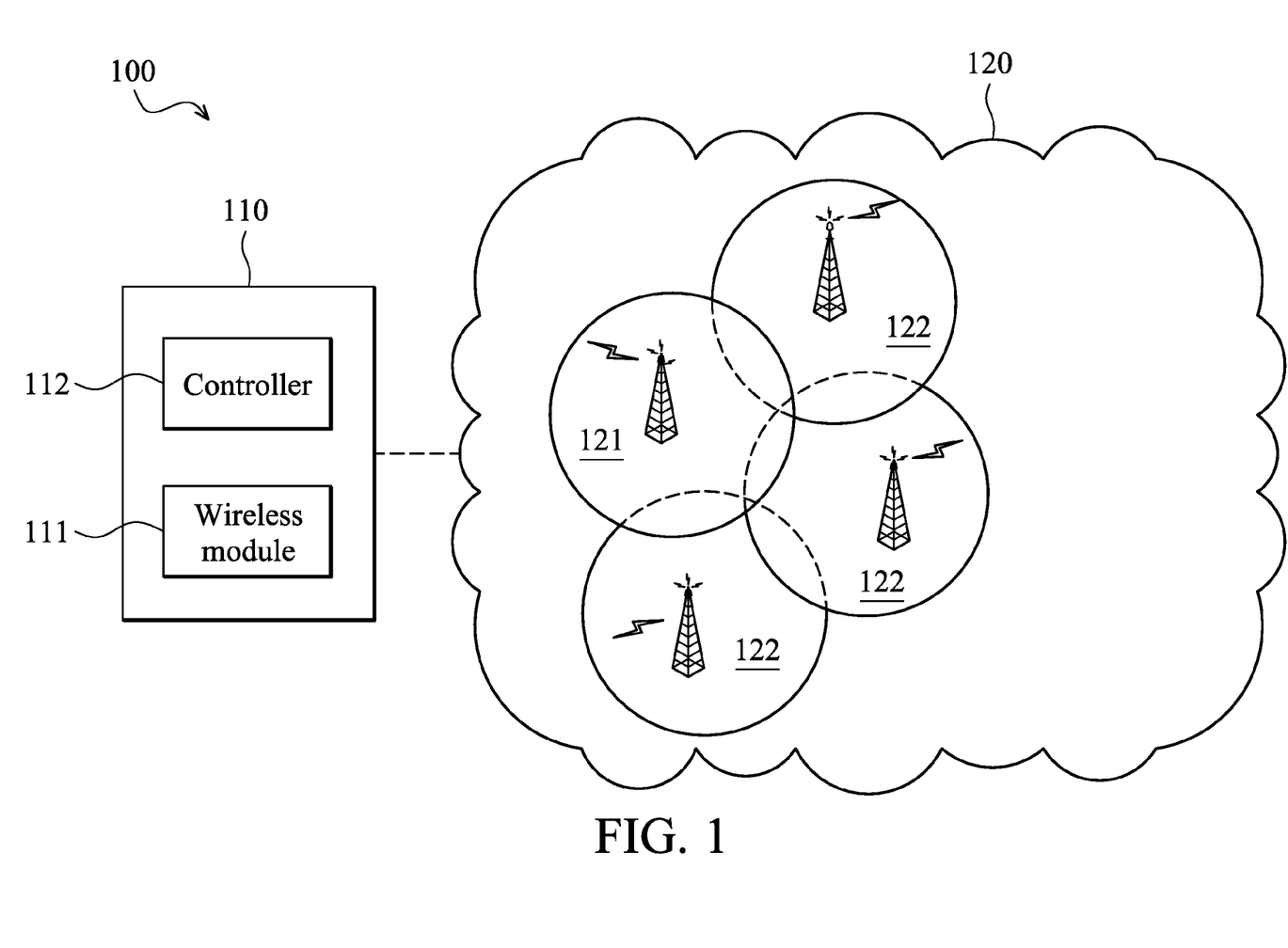
FIG. 1 is a block diagram illustrating the mobile communication system according to an embodiment of the invention.

FIG. 1 is a block diagram illustrating the mobile communication system according to an embodiment of the invention. In the mobile communication system 100, the mobile communication device 110 is wirelessly connected to the service network 120 via a service node among the first service node 121 and a plurality of second service nodes 122. In this embodiment, the first service node 121 establishes the serving cell for the mobile communication device 110, and the coverage of the second service nodes 122 located around the first service node 121 are the neighbor cells of the serving cell. Each of the first service node 121 and the second service nodes 122 broadcasts its own system information messages with a forward-link quality threshold. The mobile communication device 110 comprises a wireless module 111 and a controller 112. The wireless module 111 receives data communication services via the first service node 121. In addition, the wireless module 111 receives the system information messages from the first service node 121 and the second service nodes 122. Upon receiving the system information messages, the controller 112 determines a traffic type of the data communication services and a signal indicator of the first service node 121. In one embodiment, the signal indicator may be the signal strength of the pilot signal. The controller 112 further determines whether the signal indicator is less than the forward-link quality threshold corresponding to the first service node 121. If the signal indicator is less than the forward-link quality threshold (i.e., the signal quality of the first service node 121 is poor), the mobile communication device 110 switches the data communication services from the first service node 121 to one of the second service nodes 122 according to the traffic type, in order to maintain fair signal quality.

Figure 2:
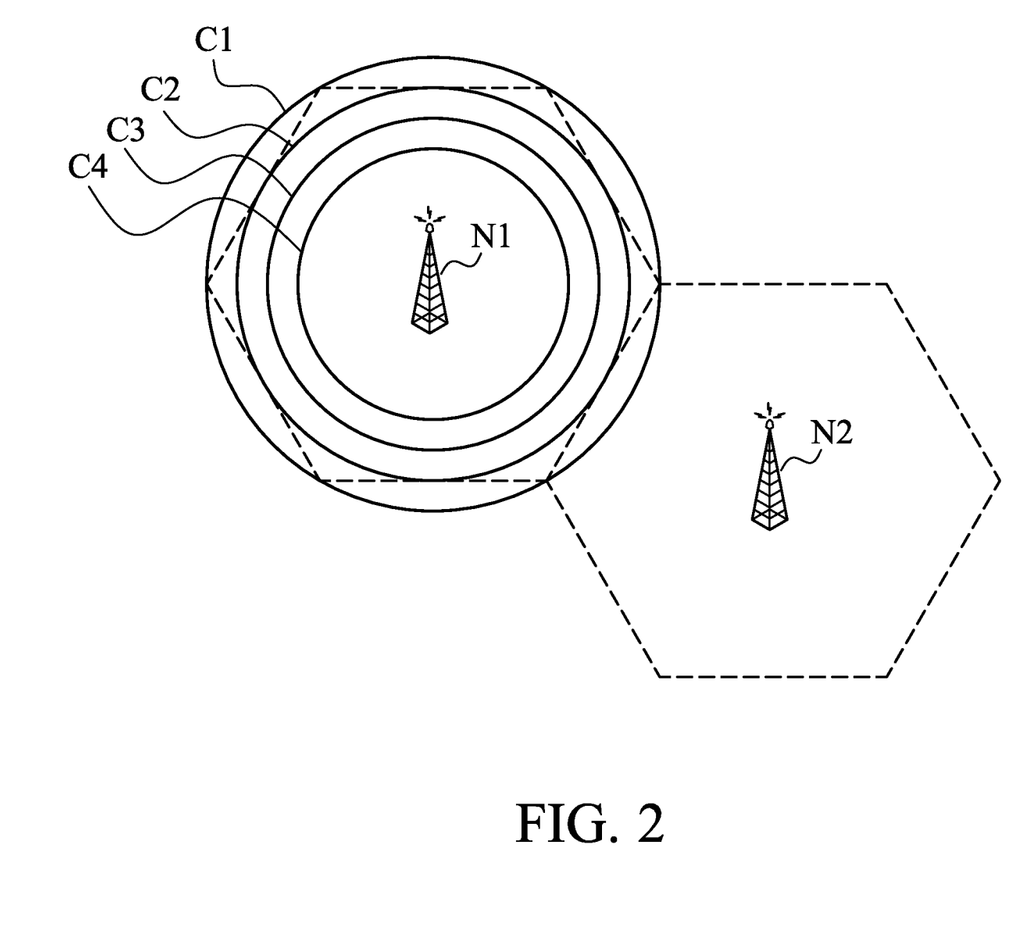
FIG. 2 is a block diagram illustrating determination of the forward-link quality threshold according to an embodiment of the invention.

Note that the forward-link quality threshold included in the system information message is used by the mobile communication device 110 as a measure of signal quality. To be more specific, the signal quality of the signals from a service node, which is larger than or equal to the forward-link quality threshold, is deemed fair enough for the mobile communication device 110 to be served by the service node. Furthermore, the forward-link quality threshold is determined according to the forward-link load level or the reverse-link load level of a respective service node. FIG. 2 is a block diagram illustrating determination of the forward-link quality threshold according to an embodiment of the invention. The coverage of the service node N1 is depicted with the circle C1. When the sector loading of the service node N1 is null, the forward-link quality threshold is set such that all ATs in the coverage of the service node N1 may obtain a fair signal quality. That is, all ATs detect that the signal qualities of the signals from the service node N1 are all greater than or equal to the forward-link quality threshold. When the sector loading of the service node N1 is light, the forward-link quality threshold is set such that only the ATs in this circle depicted as C2 may obtain a fair signal quality. When the sector loading of the service node N1 is medium, the forward-link quality threshold is set such that only the ATs in this circle depicted as C3 may obtain a fair signal quality. When the sector loading of the service node N1 is heavy, the forward-link quality threshold is set such that only the ATs in the circle depicted as C4 may obtain a fair signal quality. For example, the forward-link quality threshold may be set to L1 when the sector loading of the service node N1 is null, set to L2 when the sector loading of the service node N1 is light, set to L3 when the sector loading of the service node N1 is medium, and set to L4 when the sector loading of the service node N1 is heavy, wherein L1<L2<L3<L4. The sector loading may be the forward-link load level or the reverse-link load level. Since the sector loading of an AN may vary from time to time, the first service node 121 and the second service nodes 122 may broadcast new system information messages when the forward-link quality thresholds are adjusted due to the updates of the sector loading. Alternatively, the first service node 121 and the second service nodes 122 may transmit dedicated signaling messages with the updated forward-link quality thresholds to the mobile communication device 110. In addition, the value of the forward-link quality threshold may be determined by the service network 120, or may be negotiated by the service network 120 and the mobile communication device 110.

In another embodiment, the system information message may further comprise a forward-link load level and a reverse-link load level corresponding to a respective service node, so that the switching of data communication services between the service nodes may be performed according to the traffic type of the data communication services, and the forward-link load levels and the reverse-link load levels corresponding to the first service node 121 and the second service nodes 122. The traffic type may be determined by monitoring the transmission and reception buffers (not shown) utilized in data communications in the wireless module 111. For example, the traffic type is forward-link dominant if the amount of data in the transmission buffer is a lot less than that in the reception buffer, the traffic type is reverse-link dominant if the amount of data in the transmission buffer is a lot larger than that in the reception buffer, and the traffic type is bi-directionally symmetric if the amount of data in the transmission buffer is close to that in the reception buffer. To follow up, if the traffic type is forward-link dominant, e.g. FTP downloading or video streaming, the mobile communication device 110 may select one of the second service nodes 122 with the lightest forward-link load level and switch the data communication services from the first service node 121 to the selected second service node 122. If the traffic type is reverse-link dominant, e.g. FTP uploading, the mobile communication device 110 may select one of the second service nodes 122 with the lightest reverse-link load level and switch the data communication services from the first service node 121 to the selected second service node 122. If the traffic type is bi-directionally symmetric, e.g. web browsing or VoIP, the mobile communication device 110 may select one of the second service nodes 122 according to the more severe one of the forward-link load level and the reverse-link load level. For a more severe forward-link load level, the mobile communication device 110 may select one of the second service nodes 122 with the lightest forward-link load level and switch the data communication services from the first service node 121 to the selected second service node 122. Otherwise, for a more severe reverse-link load level, the mobile communication device 110 may select one of the second service nodes 122 with the lightest reverse-link load level and switch the data communication services from the first service node 121 to the selected second service node 122. It is noted that if there are more than one of the second service nodes 122 having the lightest forward-link load level or reverse-link load level, the mobile communication device 110 may select the one with the higher signal quality for the switching of data communication services between the service nodes. In addition, if the switching between the service nodes fails, the mobile communication device 110 stays in the first service node 121.

Figure 3:
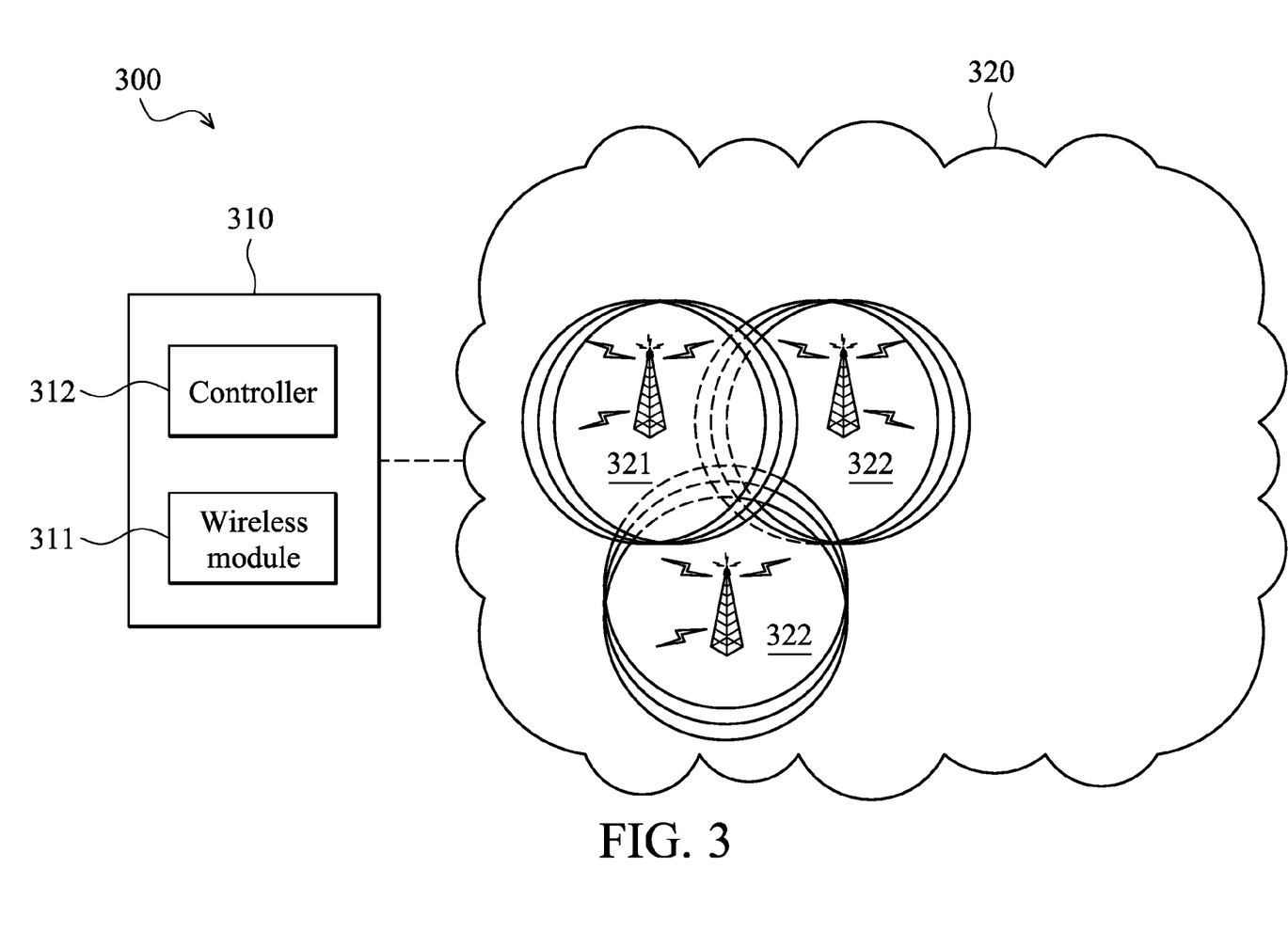
FIG. 3 is a block diagram illustrating the mobile communication system according to another embodiment of the invention.

FIG. 3 is a block diagram illustrating the mobile communication system according to another embodiment of the invention. In the mobile communication system 300, the service network 320 supports the Multiple-Carrier Modulation technique, in which each of the first service node 321 and the second service nodes 322 transceives radio signals in multiple carriers and each of the carriers may be used to serve the ATs separately. The mobile communication device 310 is wirelessly connected to the service network 320 via a carrier of one of the first service node 321 and at least one second service node 322. In this embodiment, each of the first service node 321 and the second service node 322 supports 3 carriers, and the second service node 322 is located next to the first service node 321, wherein a first carrier of the first service node 321 forms the serving cell for the mobile communication device 310, and the remaining carriers of the first service node 321 and the second service node 322 form the neighbor cells of the serving cell. Each of the first service node 321 and the second service node 322 broadcasts, for every underlying carrier, a respective system information message with a forward-link load level included. The mobile communication device 310 comprises a wireless module 311 and a controller 312. The wireless module 311 receives data communication services via the first carrier of the first service node 321. In addition, the wireless module 311 receives the system information messages from the first carrier and the rest carriers (referred to as second carriers herein) of the first service node 321 and the second service node 322. The controller 312 determines the signal indicators of the first carrier and the second carriers. In one embodiment, the signal indicator may be the signal strength of the pilot signal. The controller 312 further determines whether to switch the data communication services from the first carrier to another, by using a random probability based mechanism. The random probability based mechanism works as follows. The controller 312 first generates a random number $\alpha$ and then determines whether the random number $\alpha$ is less than a predetermined threshold $\rho$ corresponding to the forward-link load level of the first carrier. The predetermined threshold $\rho$ is set in advance according to the forward-link load level. For example, if the forward-link load level is null or light, the predetermined threshold $\rho$ is set to 0. If the forward-link load level is medium, the predetermined threshold $\rho$ is set to 0.2. If the forward-link load level is heavy, the predetermined threshold $\rho$ is set to 0.4. The forward-link load level may be defined by classifying the loading of the forward link into several levels. In one embodiment, there may be 4 levels for the loading of the forward link, and 2 bits are used to indicate the forward-link load level, wherein '00' stands for a null loading, '01' stands for a light loading, '10' stands for a medium loading, and '11' stands for a heavy loading.

Alternatively, the controller 312 may determine whether to switch the data communication services from the first carrier to another, by using a random delay based mechanism. The random delay based mechanism works as follow. The controller 312 monitors the forward-link load level. In response to detecting that the forward-link load level is medium or heavy, the controller 312 determines to switch the data communication services from the first carrier to another but waits until a random time interval $\Delta T$ has passed. The service network 320 may further set an upper limit for the random time interval $\Delta T$ and send it to the mobile communication device 310, so that the waiting period may be properly controlled. Otherwise, the controller 312 may use the random probability based mechanism and the random delay based mechanism for determining whether to switch the data communication services from the first carrier to another. That is, the controller 312 first performs the random probability based mechanism to determine whether to switch the serving carrier or not, and then performs the random delay based mechanism to wait for the random time interval $\Delta T$ before switching the serving carrier.

If the random number $\alpha$ is less than the predetermined threshold $\rho$, or the random time interval $\Delta T$ has passed, the controller 312 continues to select a target carrier from the second carriers according to the signal indicators and the forward-link load levels corresponding to the first carrier and the second carriers, and switch the data communication services from the first carrier to the target carrier. To be more specific, the controller 312 first selects the set C of carriers with the lightest forward-link load level among the second carriers. The set C may be given as $C=\arg\{\min(LN_i-LS)\}$, wherein $LN_i$ and LS represent the forward-link load levels of the second carrier i and the first carrier, respectively. The controller 312 further selects from the set C the target carrier with signal quality closest to the first carrier. The target carrier may be given as $t=\arg\{\min(|PSN_i-PSS|)\}$, i∈C and $(|PSN_i-PSS|)<\Delta P$, wherein $PSN_i$ and PSS represent the signal qualities of the second carrier i and the first carrier, respectively, and $\Delta P$ represents a preference limit of the difference between the signal qualities of the second carrier i and the first carrier. With the setting of the value of $\Delta P$, the target carrier may be selected with signal quality as close to the first carrier as possible, such that inter-carrier cell switching has higher priority than inter-node cell switching. If no carrier fulfills the above conditions, the mobile communication device 310 stays in the first carrier. If a target carrier is selected, the controller 312 switches the data communication services from the first carrier to the target carrier. After switching the data communication services from the first carrier to the target carrier, the controller 312 waits for a predetermined time interval until the next determination procedure. The controller 312 may start a timer with the predetermined time interval, and not perform the next determination procedure until the timer expires. By waiting during the predetermined time interval, the ping-pong effect may be avoided so that the stability of the mobile communication system 300 may be achieved.

In another embodiment, the selection of a target carrier may be performed differently by taking into account the traffic type of the data communication services. The target carrier t may be selected by applying the following equation:

$$t=\arg\{\min[(PS_s-PS_{Ni})+(L_{Ni}-L_s)\times k]\},$$

wherein $PS_s$ and $PS_{Ni}$ represent the signal qualities of the first carrier and the second carrier Ni, respectively, $L_{Ni}$ and $L_s$ represent the forward-link load level of the second carrier Ni and the first carrier, respectively, and k represents the traffic type. To be more specific, if the traffic type is forward-link dominant or bi-directionally symmetric, k is assigned a positive number. Otherwise, if the traffic type is reverse-link dominant, k is set to zero. With a positive-valued k, the carrier with lighter forward-link load level is more likely to be selected. Thus, the sector loading of the first carrier may be distributed to other lighter loaded carriers and the overall throughput of the service network 320 may be improved. With a zero-valued k, the carrier with better signal quality is more likely to be selected.

Yet in another embodiment, the selection of the target carrier may be performed by the service network 320. The service network 320 may further comprise a Base Station Controller (BSC) (not shown) for managing the operation of the first service node 321 and the second service node 322. Upon determining signal indicators of the first carrier and the second carriers, the mobile communication device 310 may report the determined signal indicators to the BSC of the service network 320. Meanwhile, the BSC collects the sector loading information of the first carrier and the second carriers from the first service node 321 and the second service node 322. Subsequently, the BSC determines which carrier the mobile communication device 310 should switch to according to the signal indicators and the sector loading information, and then informs the mobile communication device 310 to switch the data communication services from the first carrier to the target carrier.

In addition, the mobile communication device 310 may maintain an active set of reverse-links for soft handover. Since an AT in an AN with heavier reverse-link load level is more eager to have a larger active set than an AT in an AN with lower reverse-link load level, the system information message may further comprise a reverse-link load level corresponding to a respective carrier, to assist the mobile communication device 310 in managing the active set. Conventionally, the parameters PilotAdd and AddIntercept are used to determine the adding of carriers into the active set, and the parameters PilotDrop and DropIntercept are used to determine the removing of carriers from the active set. In the present invention, the parameters used to manage the active set may be adjusted according to the reverse-link load levels of the active carriers in the active set as follows:

RelativePilotAdd=PilotAdd−LoadingAdjust,

RelativePilotDrop=PilotDrop−LoadingAdjust,

RelativeAddIntercept=AddInterept−LoadingAdjust,

RelativeDropIntercept=DropInterept−LoadingAdjust, wherein the parameter LoadingAdjust is set to the highest reverse-link load level among the reverse-link load levels of the active carriers in the active set, and the parameters RelativeAddIntercept and RelativeDropIntercept are only used when a dynamic threshold mechanism is applied. Thus, the parameters RelativePilotAdd and RelativeAddIntercept are used to determine the adding of carriers into the active set, and the parameters RelativePilotDrop and RelativeDropIntercept are used to determine the removing of carriers from the active set. Regarding the detailed description of the dynamic threshold mechanism and the parameters PilotAdd, AddIntercept, PilotDrop, and DropIntercept, references may be made to the 3GPP2 specification of the RevB 1×HRPD system (the 3GPP2 C.S-0024-B v3.0 specification).

It is noted that the determination procedure of whether to switch serving carrier and the target carrier selection process utilized in the mobile communication system 300 may also be applied to the mobile communication system 100, or to a mobile communication system which supports the multiple carrier or single carrier technique. Likewise, the determination procedure of whether to switch service node and the target service node selection process utilized in the mobile communication system 100 may also be applied to the mobile communication system 300, or to a mobile communication system which supports the multiple carrier or single carrier technique.

Figure 4:
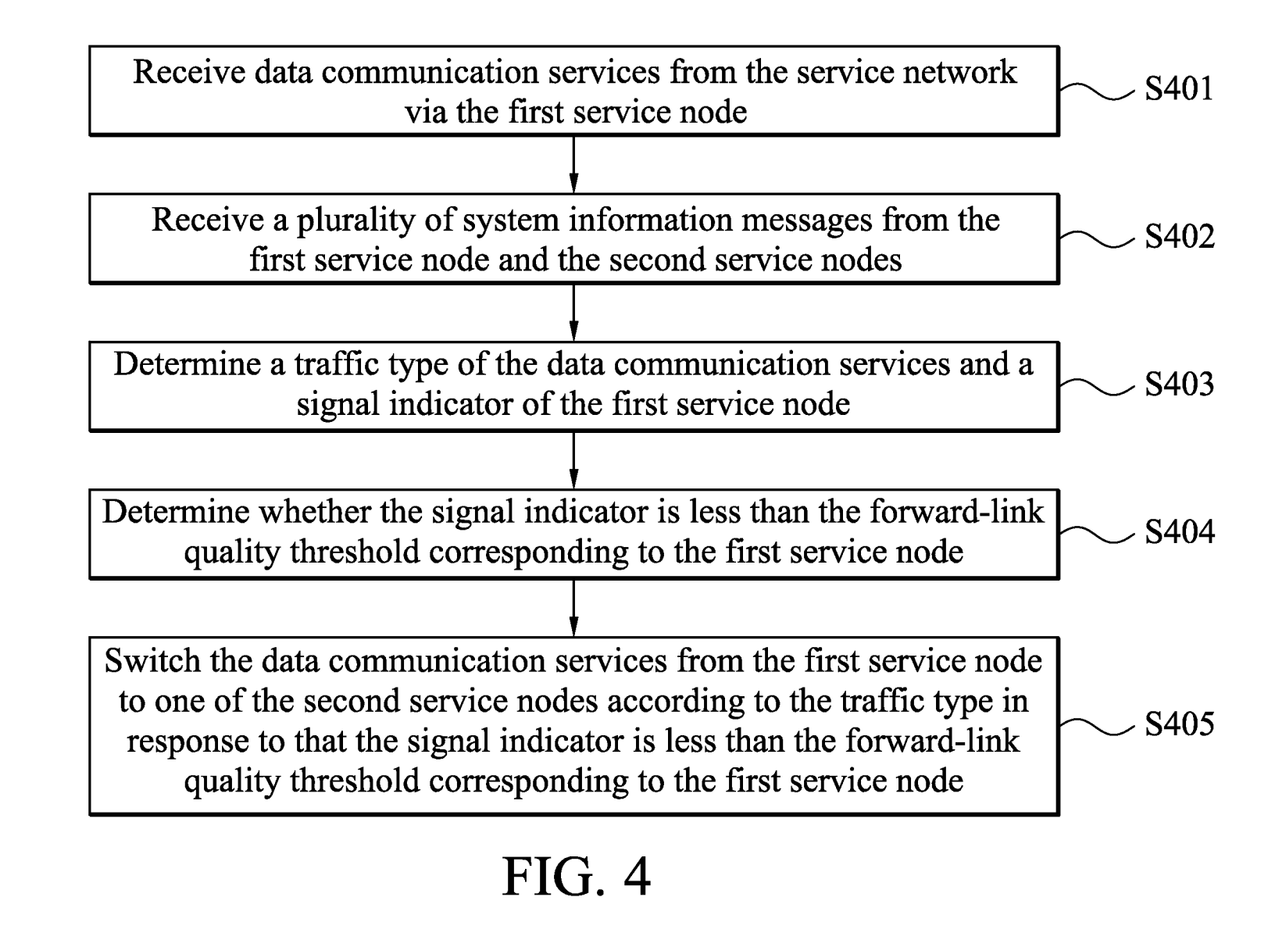
FIG. 4 is a flow chart of the load balancing management method according to the embodiment of FIG. 1.

FIG. 4 is a flow chart of the load balancing management method according to the embodiment of FIG. 1. At first, the mobile communication device 110 is wirelessly connected to the service network 120 for receiving data communication services from the service network 120 via the first service node 121 (step S401). After camping on the cell established by the first service node 121, the mobile communication device 110 receives a plurality of system information messages from the first service node 121 and the second service nodes 122, wherein each of the system broadcast messages comprises a forward-link quality threshold corresponding to a respective service node (step S402). Regarding the setting of the forward-link quality threshold in each of the system information messages, reference may be made to the example shown in FIG. 2. Subsequently, the mobile communication device 110 determines a traffic type of the data communication services and a signal indicator of the first service node 121 (step S403), and then further determines whether the signal indicator is less than the forward-link quality threshold corresponding to the first service node 121 (step S404). The signal indicator may be the signal strength of the pilot signal. If the signal indicator is less than the forward-link quality threshold corresponding to the first service node 121, the mobile communication device 110 switches the data communication services from the first service node 121 to one of the second service nodes 122 according to the traffic type (step S405). Specially, each of the system information messages further comprises a forward-link load level and a reverse-link load level corresponding to a respective service node, so that the mobile communication device 110 may switch the data communication services from the first service node 121 to one of the second service nodes 122 with the lowest forward-link load level if the traffic type is forward-link dominant. If the traffic type is reverse-link dominant, the mobile communication device 110 may switch the data communication services from the first service node 121 to one of the second service nodes 122 with the lowest reverse-link load level. Otherwise, if the traffic type is bi-directionally symmetric, the mobile communication device 110 may switch the data communication services from the first service node 121 to one of the second service nodes 122 according to the more severe one of the forward-link load level and the reverse-link load level. If the forward-link load level is more severe than the reverse-link load level, the mobile communication device 110 switches the data communication services from the first service node 121 to one of the second service nodes 122 with the lowest forward-link load level. If the reverse-link load level is more severe than the forward-link load level, the mobile communication device 110 switches the data communication services from the first service node 121 to one of the second service nodes 122 with the lowest reverse-link load level.

Figure 5:
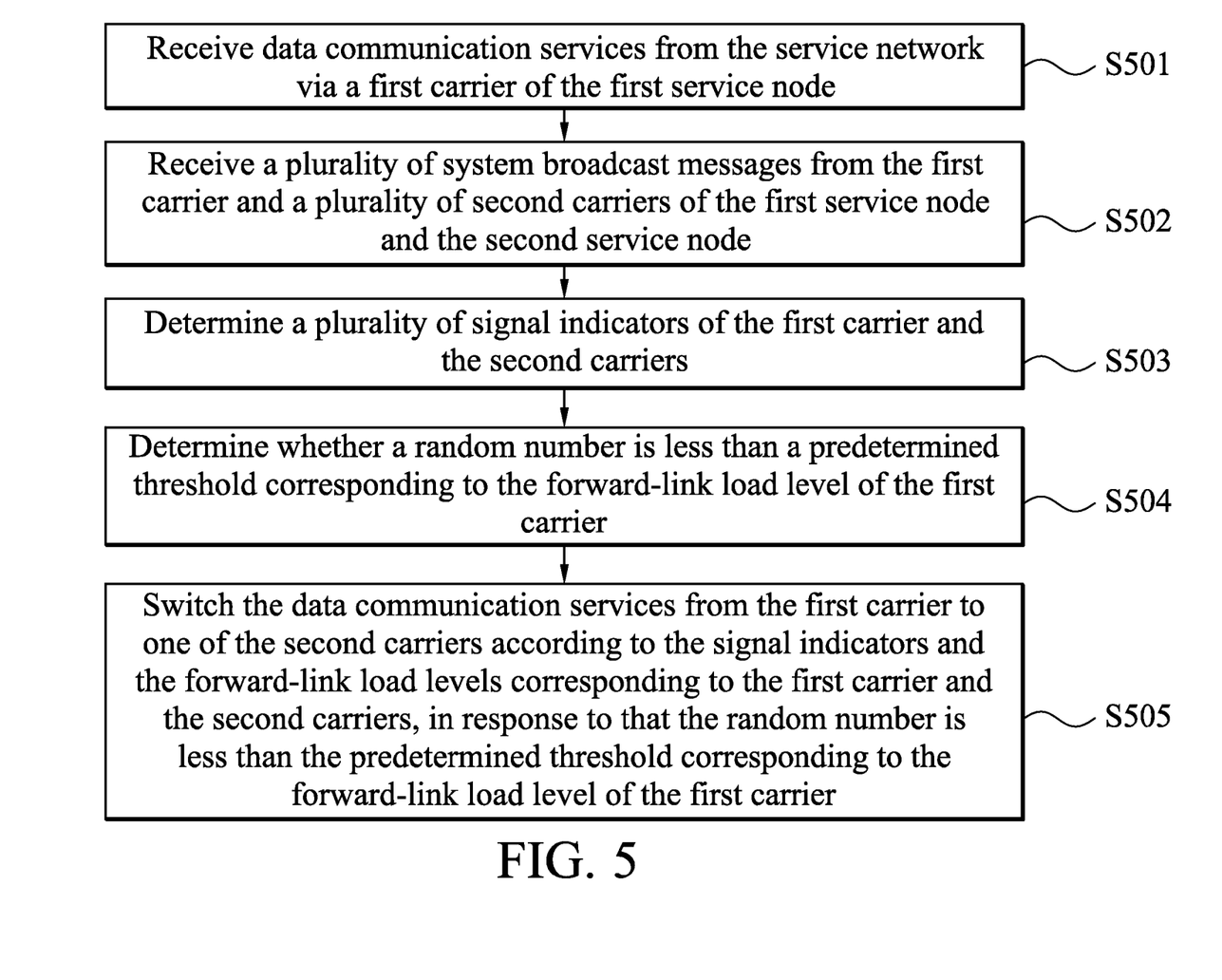
FIG. 5 is a flow chart of the load balancing management method according to the embodiment of FIG. 3.

FIG. 5 is a flow chart of the load balancing management method according to the embodiment of FIG. 3. The load balancing management method is applied to the mobile communication system 300, in which the service network 320 supports the Multiple-Carrier Modulation technique and each of the first service node 321 and the at least one second service node 322 transceives radio signals in multiple carriers. Initially, the mobile communication device 310 is wirelessly connected to the service network 320 for receiving data communication services from the service network 320 via a first carrier of the first service node 321 (step S501). After camping on the cell formed by the first carrier, the mobile communication device 310 receives a plurality of system broadcast messages from the first carrier and a plurality of second carriers of the first service node 321 and the second service node 322, wherein each of the system broadcast messages comprises a forward-link load level corresponding to a respective carrier (step S502). Subsequently, the mobile communication device 310 determines a plurality of signal indicators of the first carrier and the second carriers (step S503), and then further determines whether a random number is less than a predetermined threshold corresponding to the forward-link load level of the first carrier (step S504). The signal indicator may be the signal strength of the pilot signal. If the random number is less than the predetermined threshold corresponding to the forward-link load level of the first carrier, the mobile communication device 310 switches the data communication services from the first carrier to one of the second carriers according to the signal indicators and the forward-link load levels corresponding to the first carrier and the second carriers (step S505). Specially, the predetermined threshold is set in advance according to the forward-link load level. For example, the predetermined threshold is set to 0 if the forward-link load level is null or light, the predetermined threshold ρ is set to 0.2 if the forward-link load level is medium, and the predetermined threshold ρ is set to 0.4 if the forward-link load level is heavy. In this embodiment, the forward-link load level is defined by classifying the loading of the forward link into 4 levels; while in other embodiments, the number of the forward-link load level may be set to more than 4 or less than 4. In order to avoid the flocking of ATs to the target carrier, the mobile communication device 310 may further wait for a random time interval before proceeding to step S505. In addition, the mobile communication device 310 may determine a traffic type of the data communication services, and switch the data communication services from the first carrier to one of the second carrier with the lowest forward-link load level of all the forward-link load levels of the first carrier and the second carriers if the traffic type is forward-link dominant or bi-directionally symmetric. Otherwise, the mobile communication device 310 may switch the data communication services from the first carrier to one of the second carrier with the highest signal quality among all carriers if the traffic type is reverse-link dominant. After switching the data communication services from the first carrier to one of the second carriers, a timer with a predetermined time interval may be started, and a subsequent determination procedure to determine whether to switch serving cell again should not be performed until the expiration of the timer, such that the ping-pong effect is avoided and system stability is achieved.

While the invention has been described by way of example and in terms of preferred embodiment, it is to be understood that the invention is not limited thereto. Those who are skilled in this technology can still make various alterations and modifications without departing from the scope and spirit of this invention. For example, the mobile communication systems 100 and 300 may be in compliance with 1×CDMA 2000 technology (including RevA 1×HRPD, RevB 1×HRPD, RevC 1×HRPD, and RevD 1×HRPD technologies, or other evolutionary technologies of the 1×CDMA 2000 technology family), Worldwide Interoperability for Microwave Access (WiMAX) technology, or LTE technology, etc. In addition, the load balancing management method may be applied to any evolutionary technologies of the 1×CDMA 2000 technology family other than RevC 1×HRPD, and future evolution technologies, or WiMAX technology or LTE technology, etc. Therefore, the scope of the invention shall be defined and protected by the following claims and their equivalents.

What is claimed is:

1. A mobile communication device for load balancing management, comprising:
    a wireless module receiving data communication services from a service network via a first service node, and receiving a plurality of system information messages from the first service node and a plurality of second service nodes,
    wherein each of the system information messages comprises a forward-link quality threshold corresponding to a respective service node; and
    a controller determining a traffic type of the data communication services and a signal indicator of the first service node, determining whether the signal indicator is less than the forward-link quality threshold corresponding to the first service node, and switching the data communication services from the first service node to one of the second service nodes according to the traffic type in response to that the signal indicator is less than the forward-link quality threshold corresponding to the first service node,
    wherein after switching the data communication services from the first service node to one of the second service nodes, the controller further waits for a predetermined time interval before performing a determination procedure to determine whether a random number is less than a predetermined threshold corresponding to the forward-link load level of the switched second service node, and switches the data communication services to another second service node or the first service node in response to that the random number is less than the predetermined threshold.

2. The mobile communication device of claim 1, wherein the forward-link quality threshold in each of the system information messages is determined according to at least one of the following:
    a forward-link load level of a respective service node; and
    a reverse-link load level of a respective service node.

3. The mobile communication device of claim 1, wherein each of the system information messages further comprises a forward-link load level and a reverse-link load level corresponding to a respective service node, and the data communication services are switched from the first service node to one of the second service nodes further according to at least one of the following:
    the forward-link load levels corresponding to the first service node and the second service nodes; and
    the reverse-link load levels corresponding to the first service node and the second service nodes.

4. The mobile communication device of claim 3, wherein the switching of the data communication services is performed further in response to one of the following:
    that the traffic type is forward-link dominant and the forward-link load level corresponding to the switched second service node is lower than the forward-link load levels corresponding to the first service node;
    that the traffic type is reverse-link dominant and the reverse-link load level corresponding to the switched second service node is lower than the reverse-link load levels corresponding to the first service node; and
    that the traffic type is bi-directionally symmetric and both of the forward-link load level and the reverse-link load level corresponding to the switched second service node is lower than the forward-link load levels or the reverse-link load levels corresponding to the first service node.

5. The mobile communication device of claim 1, wherein the switching of the data communication services is delayed for a random time interval, in response to that the forward-link load level corresponding to the first service node reaches a predetermined level.

6. The mobile communication device of claim 1, wherein the forward-link load level corresponding to the switched second service node is lower than the forward-link load levels corresponding to the first service node and the other second service nodes, in response to that the traffic type is forward-link dominant or bi-directionally symmetric.

7. A mobile communication system for load balancing management, comprising:
   a service network providing data communication services via a first service node and a plurality of second service nodes, wherein each of the first service node and second service nodes broadcasts a system information message comprising a forward-link quality threshold; and
   a mobile communication device receiving the data communication services via the first service node, receiving the system information messages from the first service node and the second service nodes, determining a traffic type of the data communication services and a signal indicator of the first service node, determining whether the signal indicator is less than the forward-link quality threshold corresponding to the first service node, and switching the data communication services from the first service node to one of the second service nodes according to the traffic type in response to that the signal indicator is less than the forward-link quality threshold corresponding to the first service node,
   wherein after switching the data communication services from the first service node to one of the second service nodes, the mobile communication device further waits for a predetermined time interval before performing a determination procedure to determine whether a random number is less than a predetermined threshold corresponding to the forward-link load level of the switched second service node, and switches the data communication services to another second service node or the first service node in response to that the random number is less than the predetermined threshold.

8. The mobile communication system of claim 7, wherein the forward-link quality threshold in each of the system information messages is determined according to at least one of the following:
   a forward-link load level of a respective service node; and
   a reverse-link load level of a respective service node.

9. The mobile communication system of claim 7, wherein the system information message further comprises a forward-link load level and a reverse-link load level corresponding to the first service node and the second service nodes, and the data communication services are switched from the first service node to one of the second service nodes further according to at least one of the following:
   the forward-link load levels corresponding to the first service node and the second service nodes; and
   the reverse-link load levels corresponding to the first service node and the second service nodes.

10. The mobile communication system of claim 9, wherein the switching of the data communication services is performed further in response to one of the following:
   that the traffic type is forward-link dominant and the forward-link load level corresponding to the switched second service node is lower than the forward-link load levels corresponding to the first service node;
   that the traffic type is reverse-link dominant and the reverse-link load level corresponding to the switched second service node is lower than the reverse-link load levels corresponding to the first service node; and
   that the traffic type is bi-directionally symmetric and one of the forward-link load level and the reverse-link load level corresponding to the switched second service node is lower than the forward-link load levels or the reverse-link load levels corresponding to the first service node.

11. The mobile communication system of claim 7, wherein the switching of the data communication services is delayed for a random time interval, in response to that the forward-link load level corresponding to the first service node reaches a predetermined level.

12. The mobile communication system of claim 7, wherein the forward-link load level corresponding to the switched second service node is lower than the forward-link load levels corresponding to the first service node and the other second service nodes, in response to that the traffic type is forward-link dominant or bi-directionally symmetric.

13. A load balancing management method for a mobile communication device connected to a service network via a first service node and a plurality of second service nodes, comprising:
   receiving data communication services from the service network via the first service node;
   receiving a plurality of system information messages from the first service node and the second service nodes, wherein each of the system broadcast messages comprises a forward-link quality threshold corresponding to a respective service node;
   determining a traffic type of the data communication services and a signal indicator of the first service node;
   determining whether the signal indicator is less than the forward-link quality threshold corresponding to the first service node; and
   switching the data communication services from the first service node to one of the second service nodes according to the traffic type in response to that the signal indicator is less than the forward-link quality threshold corresponding to the first service node;
   after switching the data communication services from the first service node to one of the second service nodes, waiting for a predetermined time interval before performing a determination procedure to determine whether a random number is less than a predetermined threshold corresponding to the forward-link load level of the switched second service node; and
   switching the data communication services to another second service node or the first service node in response to that the random number is less than the predetermined threshold.

14. The load balancing management method of claim 13, wherein the forward-link quality threshold in each of the system information messages is determined according at least one of the following:
   a forward-link load level of a respective service node; and
   a reverse-link load level of a respective service node.

15. The load balancing management method of claim 13, wherein each of the system information messages further comprises a forward-link load level and a reverse-link load level corresponding to a respective service node, and the data communication services are switched from the first service node to one of the second service nodes further according to at least one of the following:

the forward-link load levels corresponding to the first service node and the second service nodes; and the reverse-link load levels corresponding to the first service node and the second service nodes.

16. The load balancing management method of claim 15, wherein the switching of the data communication services is performed further in response to one of the following:

that the traffic type is forward-link dominant and the forward-link load level corresponding to the switched second service node is lower than the forward-link load levels corresponding to the first service node;

that the traffic type is reverse-link dominant and wherein the reverse-link load level corresponding to the switched second service node is lower than the reverse-link load levels corresponding to the first service node; and that the traffic type is bi-directionally symmetric and wherein both of the forward-link load level and the reverse-link load level corresponding to the switched second service node is lower than the forward-link load levels or the reverse-link load levels corresponding to the first service node.

17. The load balancing management method of claim 13, further comprising delaying the switching of the data communication services for a random time interval, in response to that the forward-link load level corresponding to the first service node reaches a predetermined level.

18. The load balancing management method of claim 13, wherein the forward-link load level corresponding to the switched second service node is lower than the forward-link load levels corresponding to the first service node and the other second service nodes in response to that the traffic type is forward-link dominant or bi-directionally symmetric.

\* \* \* \* \*